US009324166B2

(12) United States Patent
VanCuren, Jr. et al.

(10) Patent No.: US 9,324,166 B2
(45) Date of Patent: Apr. 26, 2016

(54) SYSTEMS, METHODS, AND APPARATUSES FOR CREATING DIGITAL GLITTER

(71) Applicant: American Greetings Corporation, Cleveland, OH (US)

(72) Inventors: Robert VanCuren, Jr., Parma Heights, OH (US); Eric James Wright, Parma, OH (US)

(73) Assignee: American Greetings Corporation, Cleveland, OH (US)

( * ) Notice: Subject to any disclaimer, the term of this patent is extended or adjusted under 35 U.S.C. 154(b) by 193 days.

(21) Appl. No.: 14/104,110

(22) Filed: Dec. 12, 2013

(65) Prior Publication Data

US 2014/0210843 A1    Jul. 31, 2014

Related U.S. Application Data

(60) Provisional application No. 61/759,389, filed on Jan. 31, 2013, provisional application No. 61/802,230, filed on Mar. 15, 2013.

(51) Int. Cl.
*G09G 5/02*     (2006.01)
*G06T 11/00*    (2006.01)

(52) U.S. Cl.
CPC .................................. *G06T 11/001* (2013.01)

(58) Field of Classification Search
None
See application file for complete search history.

(56) References Cited

U.S. PATENT DOCUMENTS

| | | | |
|---|---|---|---|
| 6,043,821 A * | 3/2000 | Sprague et al. | 345/582 |
| 2002/0187285 A1 * | 12/2002 | Mitchell et al. | 428/7 |
| 2009/0021513 A1 * | 1/2009 | Joshi et al. | 345/419 |
| 2012/0011450 A1 * | 1/2012 | To | 715/752 |
| 2012/0036433 A1 * | 2/2012 | Zimmer et al. | 715/702 |
| 2012/0276880 A1 * | 11/2012 | Angorn et al. | 455/414.1 |
| 2013/0042509 A1 * | 2/2013 | Hawkins et al. | 40/124.01 |
| 2013/0080866 A1 * | 3/2013 | Ogilvie et al. | 715/202 |

* cited by examiner

*Primary Examiner* — Xiao Wu
*Assistant Examiner* — Mohammad H Akhavannik
(74) *Attorney, Agent, or Firm* — Calfee, Halter & Griswold LLP

(57) ABSTRACT

Methods and systems for rendering an electronic greeting card to a portable computing device, wherein the visually-perceived light effects of the electronic greeting card are updated in real time. The electronic greeting card is dynamically rendered to the portable computing device including these dynamic light effects.

18 Claims, 19 Drawing Sheets
(16 of 19 Drawing Sheet(s) Filed in Color)

SYSTEMS, METHODS, AND APPARATUSES FOR CREATING DIGITAL GLITTER

RELATED APPLICATIONS

This non-provisional utility patent application claims priority to and the benefit of U.S. Provisional Patent Application Ser. No. 61/759,389 filed on Jan. 31, 2013 and entitled DIGITAL GLITTER and U.S. Provisional Patent Application Ser. No. 61/802,230 filed on Mar. 15, 2013 and entitled SYSTEMS, METHODS, AND APPARATUSES FOR CREATING DIGITAL GLITTER. These applications are incorporated herein by reference in their entirety.

FIELD OF THE INVENTION

The general inventive concepts relate to creating digital graphics, more particularly, to systems, methods, and apparatuses for creating digital glitter for an electronic greeting card or any other electronic display or image.

BACKGROUND

Digital graphics have been increasingly popular in the modern technology era. With the speed of computing and processing rising exponentially over time, software and hardware developers have been quick to adopt the change to bring high quality digital graphics to consumers.

However, with a multitude of available hardware and software configurations, and with a variety of available application program interfaces, it has been difficult for graphics developers to create digital models that rendered consistently across the several platforms. This problem is accentuated with the widespread adoption of portable computing devices and the plethora of computing choices that these devices bring to the developers.

Paper greeting cards have been popular in the human culture for many decades, perhaps even centuries. The steady development in printing technology also allowed for the paper greeting cards to utilize high quality graphics properties. For example, it is popular to have glitter, foil, and embossing finishes on paper greeting cards. However, it has proven very difficult to reproduce these same physical glitter-like or shimmering finishes in a digital greeting card medium, especially in light of the wide variety of hardware and software platforms available in today's technology market.

BRIEF SUMMARY

The general inventive concepts contemplate systems, methods, and apparatuses for creating digital glitter in electronic images. By way of example, to illustrate various aspects of the general inventive concepts, several exemplary embodiments of systems, methods, and/or apparatuses are disclosed herein.

Additional features and advantages will be set forth in part in the description that follows, and in part will be obvious from the description, or may be learned by practice of the embodiments disclosed herein. The objects and advantages of the exemplary embodiments disclosed herein will be realized and attained by means of the elements and combinations particularly pointed out in the appended claims. It is to be understood that both the foregoing brief summary and the following detailed description are exemplary and explanatory only and are not restrictive of the embodiments disclosed herein or as claimed.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate some exemplary embodiments disclosed herein, and together with the description, serve to explain principles of the exemplary embodiments disclosed herein.

DETAILED DESCRIPTION

Figure 1:
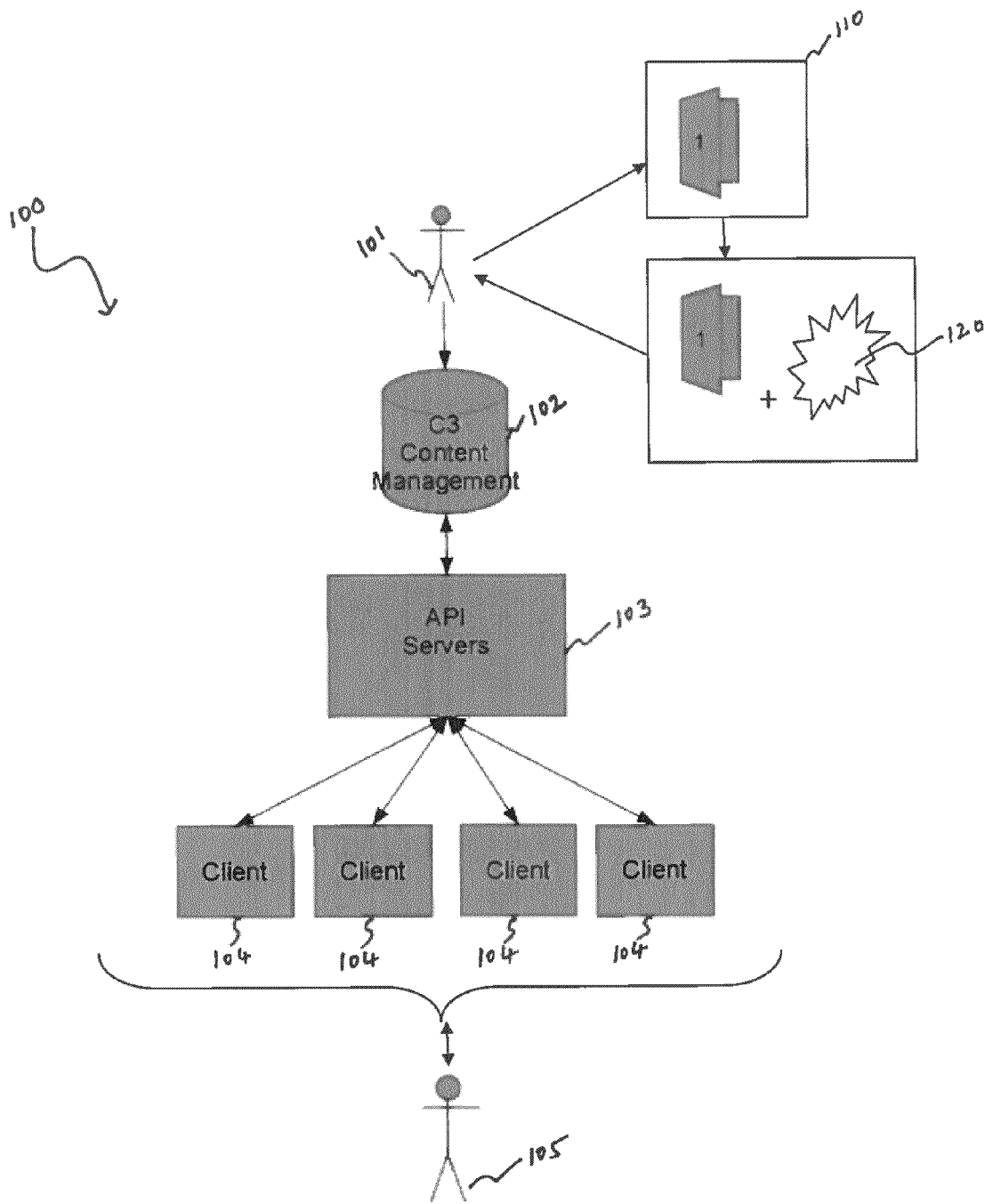
FIG. 1 represents a high level overview of the inventive system

The exemplary embodiments disclosed herein will now be described by reference to some more detailed embodiments, with occasional reference to the accompanying drawings. These exemplary embodiments may, however, be embodied in different forms and should not be construed as limited to the embodiments set forth herein. Rather, these exemplary embodiments are provided so that this disclosure will be thorough and complete, and will fully convey the scope of the embodiments to those skilled in the art. The description of the exemplary embodiments below do not limit the terms used in the claims in any way. The terms of the claims have all of their full, ordinary meanings.

Unless otherwise defined, all technical and scientific terms used herein have the same meaning as commonly understood by one of ordinary skill in the art to which these embodiments belong. The terminology used in the description herein is for describing particular embodiments only and is not intended to be limiting of the embodiments. As used in the specification and the appended claims, the singular forms "a," "an," and "the" are intended to include the plural forms as well, unless the context clearly indicates otherwise. All publications, patent applications, patents, and other references mentioned herein are incorporated by reference in their entirety.

The following are definitions of exemplary terms used throughout the disclosure. Both singular and plural forms of all terms fall within each meaning:

"Computer" or "processing unit" as used herein includes, but is not limited to, any programmed or programmable electronic device, microprocessor, or logic circuit that can store, retrieve, and process data.

"Portable computing devices" include, but are not limited to, computing devices which combine the powers of a conventional computer in portable environments. Exemplary portable computing devices include portable computers, tablet computers, internet tablets, Personal Digital Assistants (PDAs), ultra mobile PCs (UMPCs), carputers (typically installed in automobiles), wearable computers, and smartphones. The term "portable computing device" can be used synonymously with the terms "computer" or "processing unit."

A "web browser" or a "browser" as used herein, includes, but is not limited to, software for retrieving and presenting information resources on the World Wide Web. An information resource may be a web page, an image, a video, a sound, or any other type of electronic content.

"Software" or "computer program" or "application software" as used herein includes, but is not limited to, one or more computer or machine readable and/or executable instructions that cause a computer, a portable computing device, microprocessor, logic circuit, or other electronic device to perform functions, actions, and/or behave in a desired manner. The instructions may be embodied in various forms such as routines, algorithms, modules or programs, including separate applications or code from dynamically linked libraries. Software may also be implemented in various forms such as a stand-alone program, an app, a function call, a servlet, an applet, instructions stored in a memory or any other computer readable medium, part of an operating system or other type of executable instructions. It will be appreciated by one of ordinary skill in the art that the form of software is dependent on, for example, requirements of a desired application, the environment it runs on, and/or the desires of a designer/programmer or the like.

"Mobile application" or "mobile app" or "software application" or "application" or "app" as used herein, includes, but is not limited to, applications that run on smart phones, tablet computers, and other mobile or portable computing devices. The terms "mobile application" or "mobile app" or "software application" or "application" or "app" can be used synonymously with "software" or "computer program" or "application software." Mobile applications allow users to connect to services which are traditionally available on the desktop or notebook platforms. Typically, these services access the internet or intranet or cellular or wireless fidelity (Wi-Fi) networks, to access, retrieve, transmit and share data.

A "network" as used herein, includes, but is not limited to, a collection of hardware components and computers or machines interconnected by communication channels that allow sharing of resources and information, including without limitation, the worldwide web or internet.

A "server" as used herein, includes, but is not limited to, a computer or a machine or a device on a network that manages network resources. The general term "server" may include specific types of servers, such as a File Server (a computer and storage device dedicated to storing files), Print Server (a computer that manages one or more printers), a Network Server (a computer that manages network traffic), and a Database Server (a computer system that processes database queries). Although servers are frequently dedicated to performing only server tasks, certain multiprocessing operating systems allow a server to manage other non-server related resources.

A "web server" as used herein, includes, but is not limited to, a server which serves content to a web browser by loading a file from a disk and serving it across a network to a user's web browser, typically using a hyper text transfer protocol (HTTP).

"Source code" or "product code" as used herein, includes, but not limited to, a textual software code, or a machine code, or notations in graphical software languages, which specify actions to be performed by a machine, which includes, but not limited to, a computer.

Reference will now be made to the drawings. FIG. 1 represents a high level overview of the inventive system 100. System 100 has an asset builder 101 that modifies or populates an electronic greeting card 110 with assets 120. An asset builder can be a computer software program that creates initial assets or a user of the system that creates and stores assets on a system 100. Assets in general are parts of images or graphics or elements that are used to create the final image in the card, for example, a star, an animal, a flower, a pattern, etc. In the exemplary embodiment, assets 120 are, in part, components which make up "digital glitter," which is then subsequently applied to card 100 to create an electronic greeting card with digital glitter. The electronic greeting card 110 may be any commercially or non-commercially available electronic greeting card. One embodiment of a customizable electronic greeting card is disclosed in U.S. patent application Ser. No. 13/460,045, entitled "SYSTEMS, METHODS AND APPARATUSES FOR CREATING, EDITING, DISTRIBUTING, AND VIEWING ELECTRONIC GREETING CARDS," which is hereby incorporated by reference in full ("the '045 application"). The electronic greeting card disclosed in the '045 application is customizable. For instance, the electronic greeting card of the '045 application allows a user to add/edit a personalized message, a signature, and a photo to the card. For the purposes of this invention, the electronic greeting card disclosed in the '045 application will be referenced herein as the electronic greeting card 110.

Once the asset builder 101 modifies the electronic greeting card 110 with assets 120, the asset builder uploads the assets 120 to a content management system 102. The content management system 102 utilizes a scalable platform and allows the asset builder 101 to manage and edit content relating to the electronic greeting cards 110 and assets 120 dynamically and in real time. The content management system 102 is a dynamic portal engine which is built on a modular, object oriented framework allowing for component and class extensibility. The content management system 102 may be made available on a cross platform setting by utilizing known software packages such as UNIX and LINUX.

Once uploaded, the content management system 102 makes the assets 120 available to the Application Programming Interface (API) servers 103. Essentially, the API servers 103 pickup the changes made in the content management system 102. Client devices 104 are computing devices such as computers, desktops, portable computing devices, laptops, tablets, smart phones, and other web enabled devices. The API servers 103 serve the card 120 to a client device 104 whenever a user 105 accesses the electronic greeting card 120 on the client device 104.

The system interactions are handled via a communication network 132 (not shown), comprised of the asset builder 101, content management system 102, API servers 103, clients 104, users 105, the internet (not shown) and any host server(s) (not shown).

The goal of the system 100 would be to create digital assets 120 which could be implemented such that the assets 120 work across platforms on a variety of devices and operating systems. This includes the assets 120 running on devices 104 with dedicated graphics hardware and devices 104 that do not have hardware accelerated graphics. This also includes implementing the assets 120 on a number of graphics APIs in both 2 dimensional and 3 dimensional space. Some of the targeted platforms include, but are not limited to, Web browsers with support for the Canvas 2D drawing API (e.g. Internet Explorer, FireFox, Chrome, Safari, Opera); Adobe Flash player and integrated run times; and native applications (e.g. Windows, OS X, iOS, Android, Linux) for use on portable computing devices and/or computers.

System 100 is also designed so that the assets 120 and the card 110 are visually updated at a high frame rate as the user interacts with each or both of these components. This behavior simulates real world interactions of the user with a greeting card. Accordingly, system 100 is configured such that the assets 120 and card 110 are accurately rendered while the user interacts with them in one or more of the following ways: (1) moving/rotating the card via a mouse or a touch screen; (2) changing the orientation of the device 104; (3) simulating movement of a "light source"; and (4) producing the desired digital effect even without the user's interaction.

A further goal of the system 100 is to enable an acceptable level of rendering of the assets 120 and the card 110 even without utilizing complex 3D modeling software to generate bump maps, specular maps, and complex geometry, and without using excessive or too much computing power or resources. Bump mapping is a technique in computer graphics for simulating bumps and wrinkles on the surface of an object. A specular lighting represents the bright spot of light that appears on shiny objects when illuminated, and plays an important role in 3D computer graphics as it provides a strong visual cue for the shape of an object and its location with respect to light sources in the scene. Specular mapping deals with visual appearances of specular reflections.

With hardware accelerated 3D graphics API, the programming languages allow for the assets to run directly on a graphics processing unit (GPU), which is capable of running very complex algorithms very quickly. In fact, the hardware accelerated 3D graphics API allow for the lighting/shading of a large number of polygons in real time. However, since GPU programming is not available on all the target platforms of the current system 100, the current invention enables the source code and the algorithms to deliver the desired glitter effect even while running real time on low powered devices with access to only 2D drawing APIs.

Further, the current implementation of the inventive system 100 is based on blend modes. The preferred embodiments of the present invention utilize both multiply and additive blend modes. Blend modes are algorithms that determine how two images can be blended or mixed together to produce a new image. For the 2D APIs which have native hardware accelerated support for blending images, the blend mode method would be sufficient. For those APIs which may not support blend modes, the mixing of images is done at the source code level.

Figure 2:
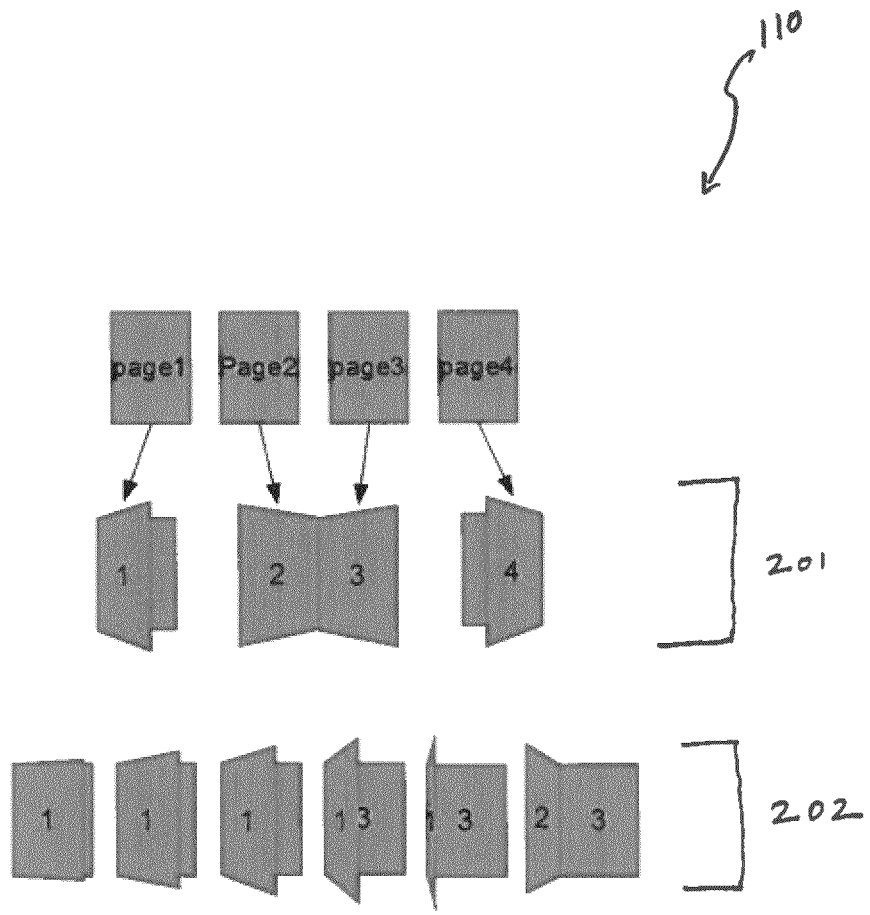
FIG. 2 shows an exemplary embodiment of an electronic greeting card prior to being modified by digital glitter.

FIG. 2 shows an exemplary embodiment of the electronic greeting card 110 prior to being modified by assets 120. The electronic greeting card 110 has four pages 1-4. The four pages are shown in 3-dimension (3D) layout in block 201. Block 202 shows the opening of the cover page (page 1) of the electronic greeting card in 3D space.

Figure 3:
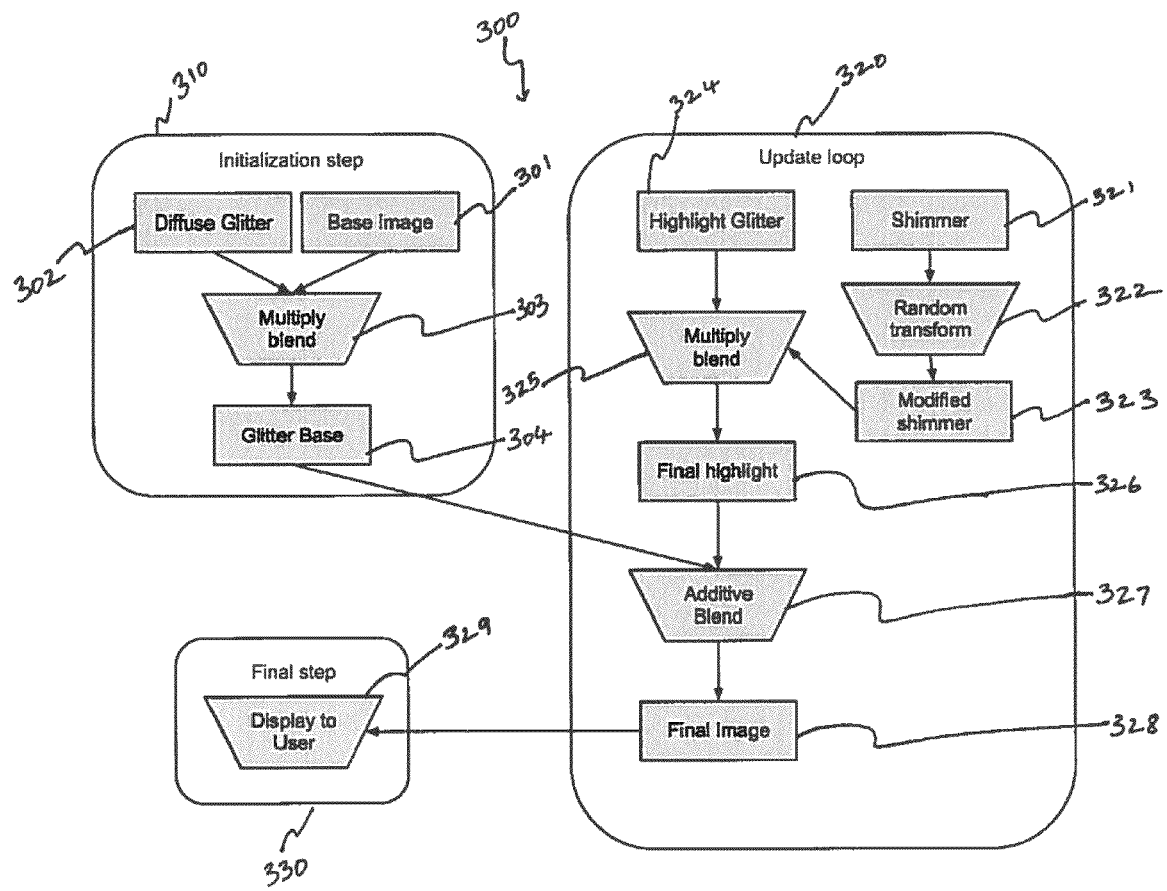
FIG. 3 shows a flow-chart representation of a "glitter shading" algorithm.

FIG. 3 shows the "glitter shading" algorithm 300 of an exemplary embodiment. The algorithm begins at the initialization step 310. Here, a base image 301 and a diffuse glitter (texture) 302 are combined, typically using a multiply blend 303, to form a glitter base image 304. The base image 301 is typically designed to be printed as a conventional image or photo imprint. While the preferred embodiment uses a multiply blend 303, any other type of blend, such as an additive blend, may be used.

The description of an added blend mode and multiplying blend mode is as follows: In a 32-bit RGBA (RGB with alpha) Color system, each channel's value is specified by 8 bits or in decimal (0-255) or in hexadecimal (#00-#FF) or in binary (00000000-11111111). For example black in hexadecimal is represented by #000000 and white is represented by FFFFFF. In an RGBA (rgb with alpha) image—what a blend mode does is to modify each pixel's color channel in one image with another pixel's color channel in a second image: with an additive blending, it simply adds the pixel color channels (e.g. 100 Red and 100 Red=200 Red). A multiply blend is when values are multiplied instead of adding. E.g., pure blacks can be 0 and pure white is 1. So, in multiply blending, any pixel multiplied by black will become black, and any pixel which is multiplied by white will be unchanged similar to multiplying numbers by 1. With multiply blending normally an image becomes darker from the base image. With an additive blend, an image usually becomes lighter than the base image.

Figure 6:
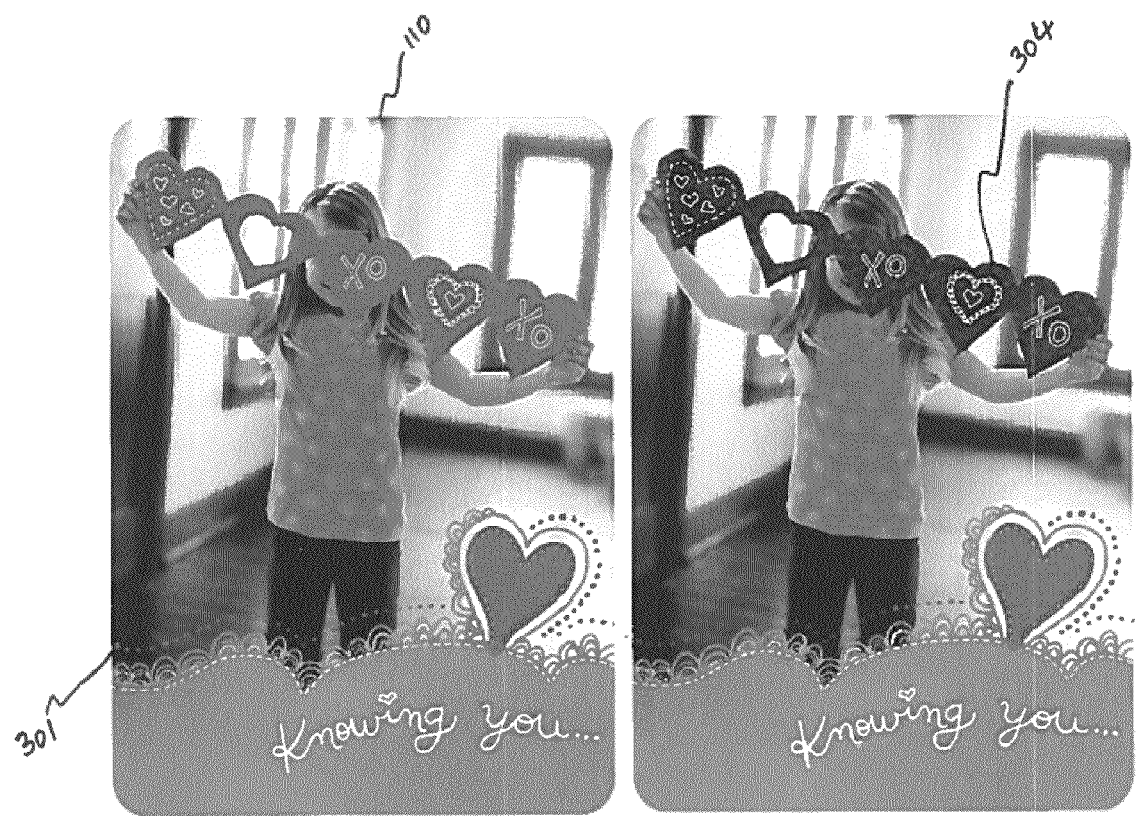
FIG. 6 shows a side by side comparison, with the electronic greeting card on the left, and the electronic greeting card with a base image on the right.

Additionally, in the exemplary embodiment, the initialization step 310 is performed and the glitter base image 304 is created before the final card image is rendered. However, in an alternate embodiment, the performance of the initialization step 310 and the creation of the glitter base image 304 may be done nearly simultaneously with the creation and rendering of the final image. The glitter base image 304 represents diffused light. Further, while the performance of the initialization step 310 and the creation of the glitter base image 304 are done by the asset builder 101 in an exemplary embodiment, in an alternate embodiment these steps may be automated by letting a computer or a server or a web server handle the initialization step 310. An example of a glitter base image 304 is shown in FIG. 6 and is further explained below.

Figure 7:
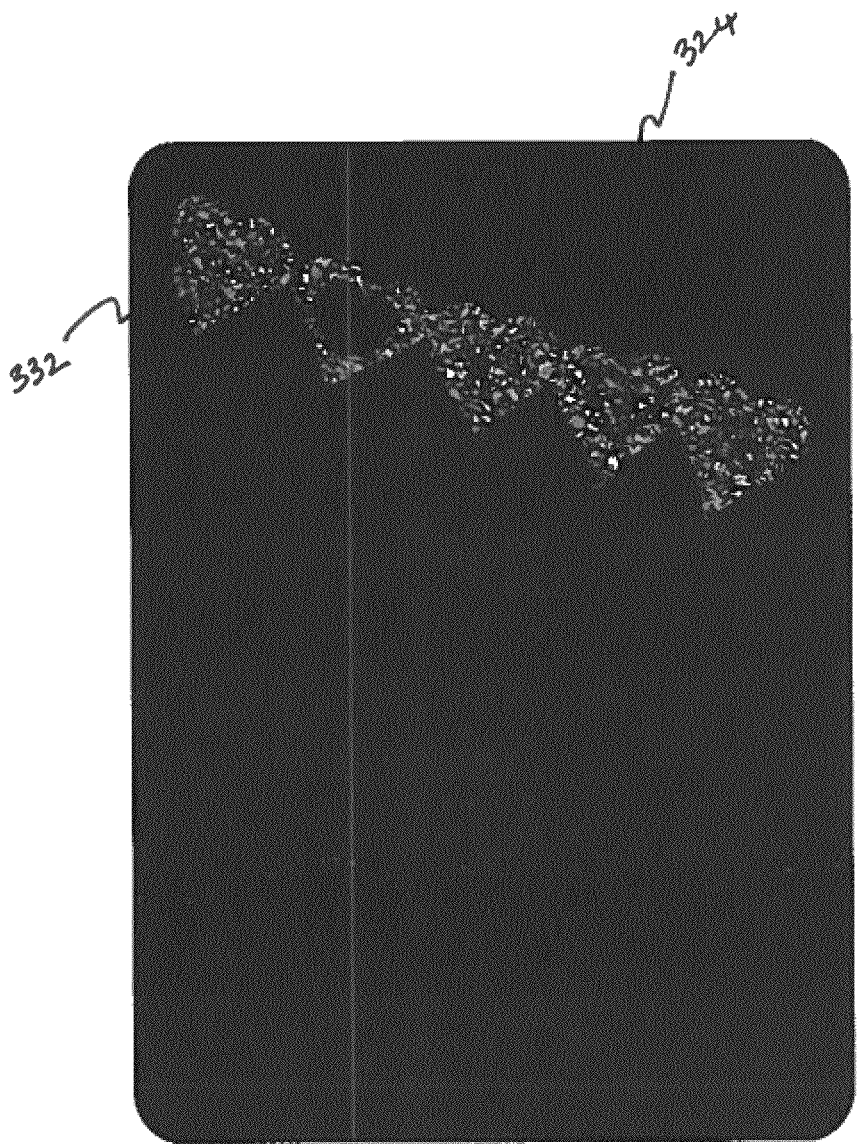
FIG. 7 shows an exemplary highlight glitter.
Figure 8:
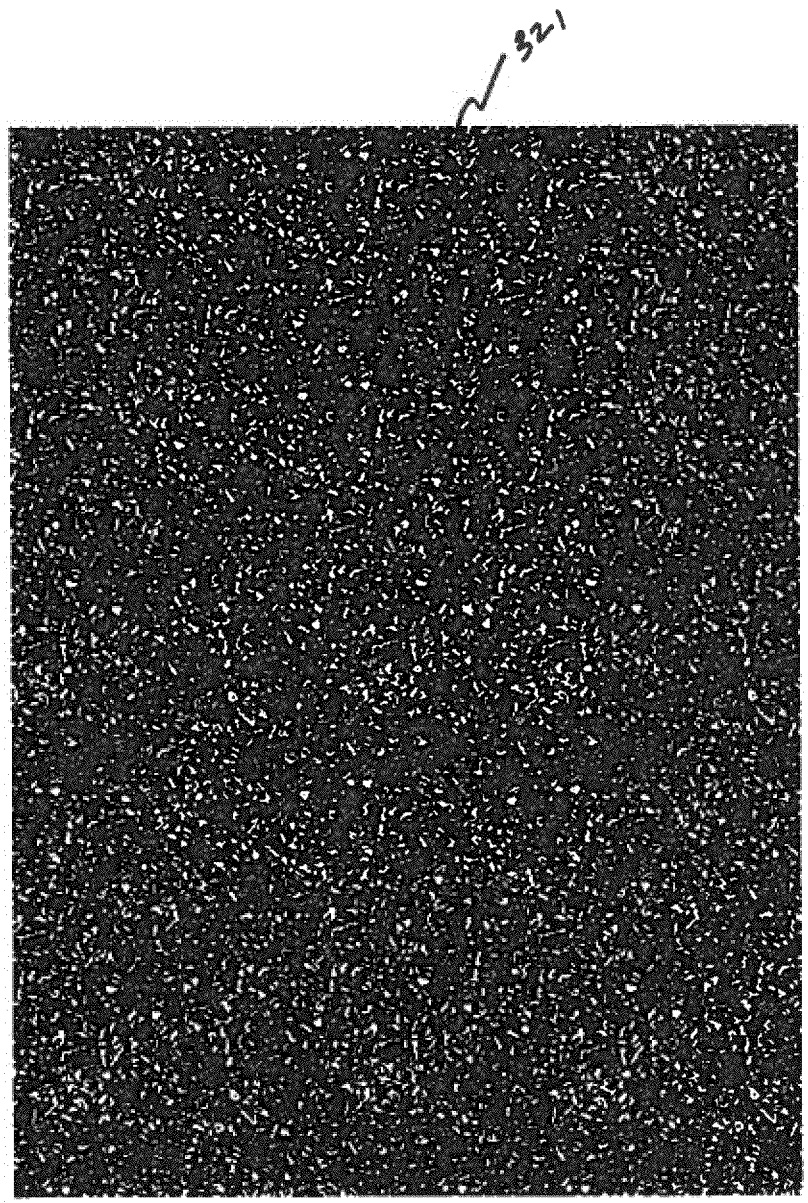
FIG. 8 shows an exemplary glitter shimmer.
Figure 13:
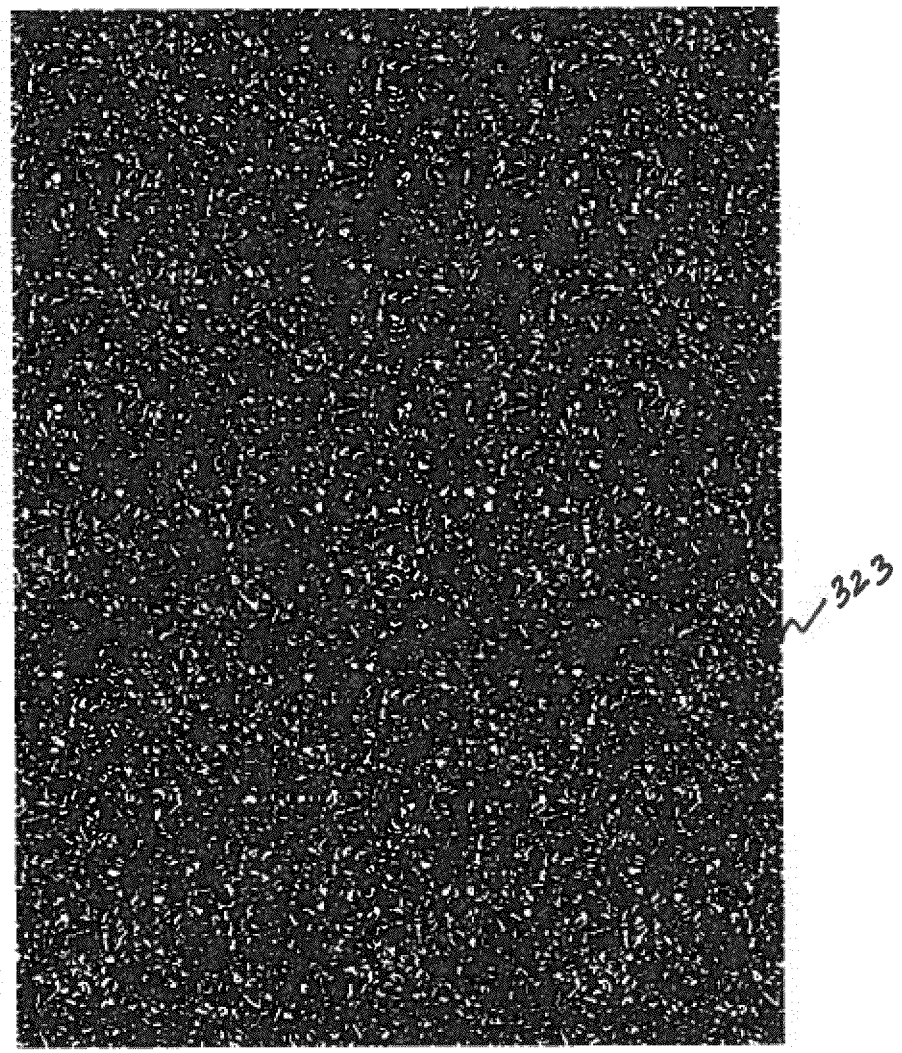
FIG. 13 shows the exemplary glitter highlight image after having a random translation applied to it.

In the update loop step 320, a shimmer texture 321 is transformed based on either the current viewing angle of the card 110, or via a random transformation step 322, to produce a modified shimmer 323. An example of a shimmer texture 321 is shown in FIG. 8 and is further explained below. The modified shimmer texture 323 is then blended on to a highlight glitter 324 using a multiply blend mode 325. An example of a modified shimmer texture 323 is shown in FIG. 13 and is further described below. An example of a highlight glitter 324 is shown in FIG. 7 and is further described below. Again, while the preferred embodiment uses a multiply blend 325, any other type of blend, such as an additive blend, may be used. The result of the highlight glitter 324 blending with modified shimmer 323 is a final highlight 326.

The final highlight 326 is then additively blended at step 327 with the glitter base image 304 to produce a final image 328. In the final step 330, the final image 328 is displayed to the user 105. The final image 328 may be displayed to the user 105 either directly on a screen display or by applying it to a 3D environment as a texture in step 330. Examples of the final image are shown in FIGS. 16, 17, 18 and 19.

Figure 4:
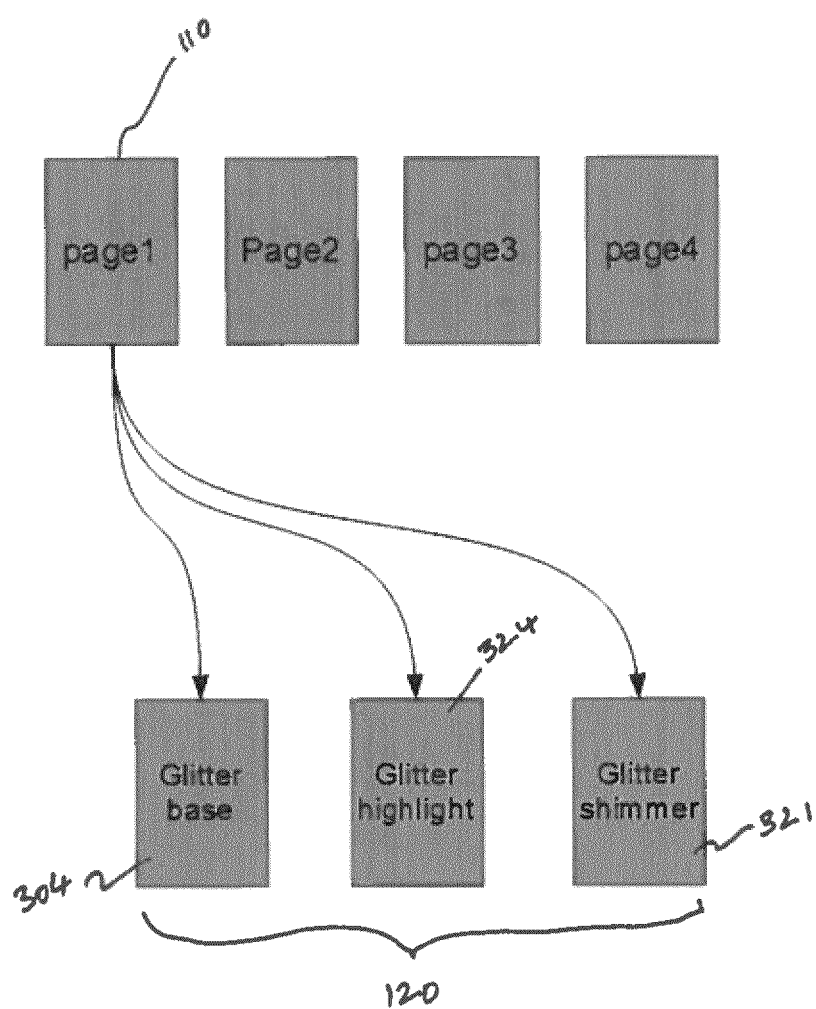
FIG. 4 shows a high level view of assets being connected with the cover page of the electronic greeting card.
Figure 5:
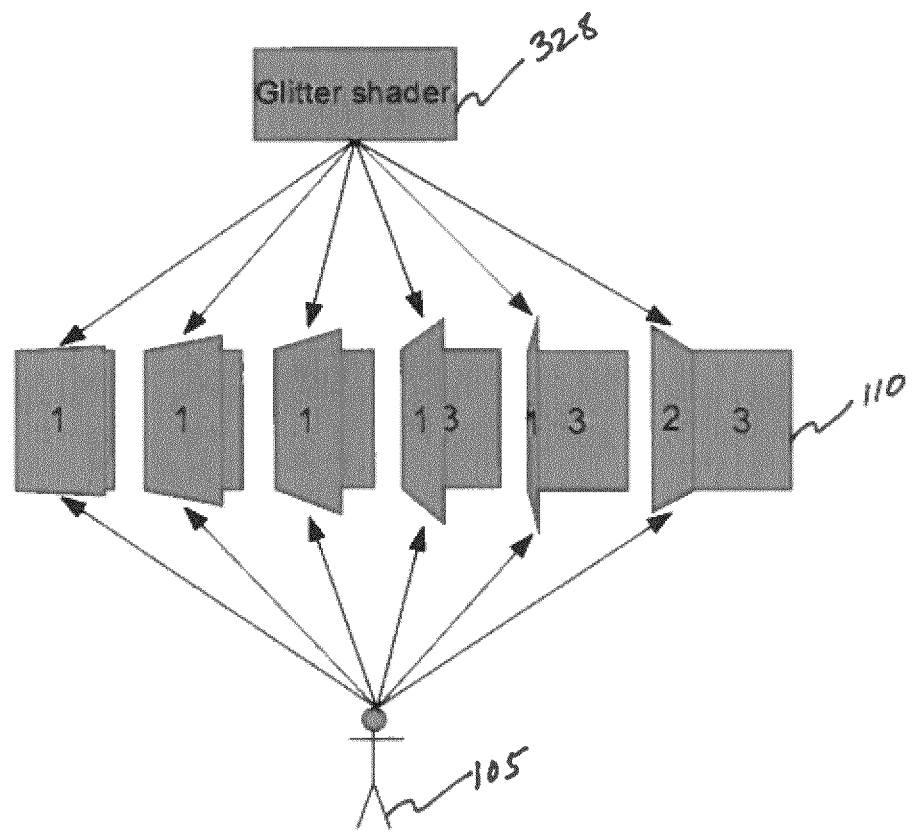
FIG. 5 shows a high level view of a glitter shader image being applied to the electronic greeting card.

FIG. 4 shows a high level view of the assets 120 being connected with the cover page of the electronic greeting card 110. As can be seen from FIGS. 3 and 4, the final digital glitter effect is a blend of three images, the glitter base 304, highlight glitter 324 and shimmer 321. FIG. 5 shows a high level view of the final image 328, called a glitter shader, being applied to the electronic greeting card 110, and the user 105 accessing the electronic greeting card with digital glitter.

FIG. 6 shows a side by side comparison, with the original electronic greeting card 110 without any digital glitter blended in on the left, and the electronic greeting card 110 base image 304 containing the blended-in digital glitter on the right. The base image 301 (which comprises greeting card 110) is an image which may or may not contain transparency. Transparency of an image is the inherent property to see through an image, and in contrast an opaque image is one that cannot be seen through. This image 301 represents what a finished paper greeting card would look like if it was rendered using only diffuse lighting, or what it would look like in a very low light situation where the finishing would not appear to be shiny. In the exemplary embodiment, this image 301 is created manually by the asset builder 101, but in other embodiments of this invention it could be generated using a software algorithm.

FIG. 7 shows an exemplary highlight glitter 324. Highlight glitter 324 simulates the specular lighting of the glitter, and is an image which may or may not contain transparency. The asset builder 101 may define certain parts of the image 324 that will receive highlights 332 while leaving other areas of the image 324 blank. Color and intensity of the highlights 332 as part of the final image 328 are dictated using this image 324. "Highlight" glitter image 324 defines the shiny objects in a digital image such as, for example, an electronic greeting card.

FIG. 8 shows an exemplary glitter shimmer texture 321. The glitter shimmer texture image 321 simulates the specular lighting of the glitter, and is an image that may or may not contain transparency. The glitter shimmer texture image 321 image provides a way to tessellate the highlights 332 previously described. Image 321 is necessary to offset the lack of usage of 3D lighting in the system 100. As can be seen from FIG. 8, typically, shimmer texture images such as image 321 appear as "noise" when not blended with other images, such as provided in FIG. 3.

Figure 9:
FIG. 9 shows an exemplary electronic greeting card.
Figure 10:
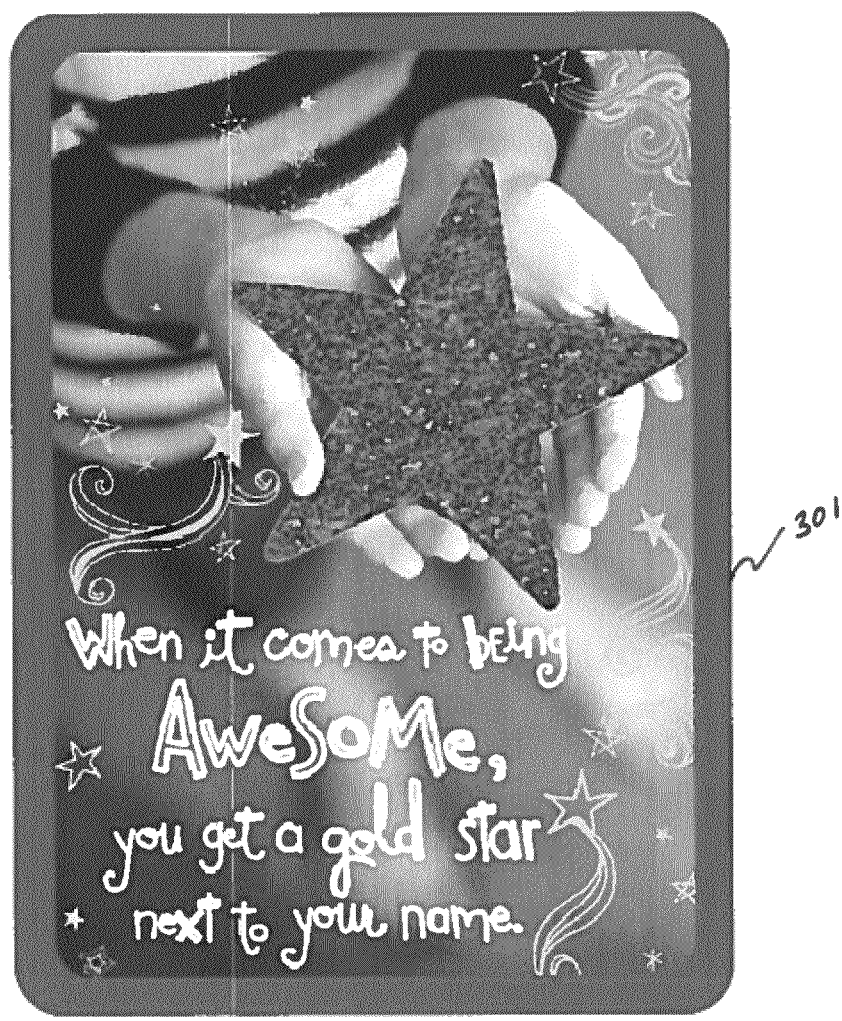
FIG. 10 shows an exemplary glitter base image.
Figure 11:
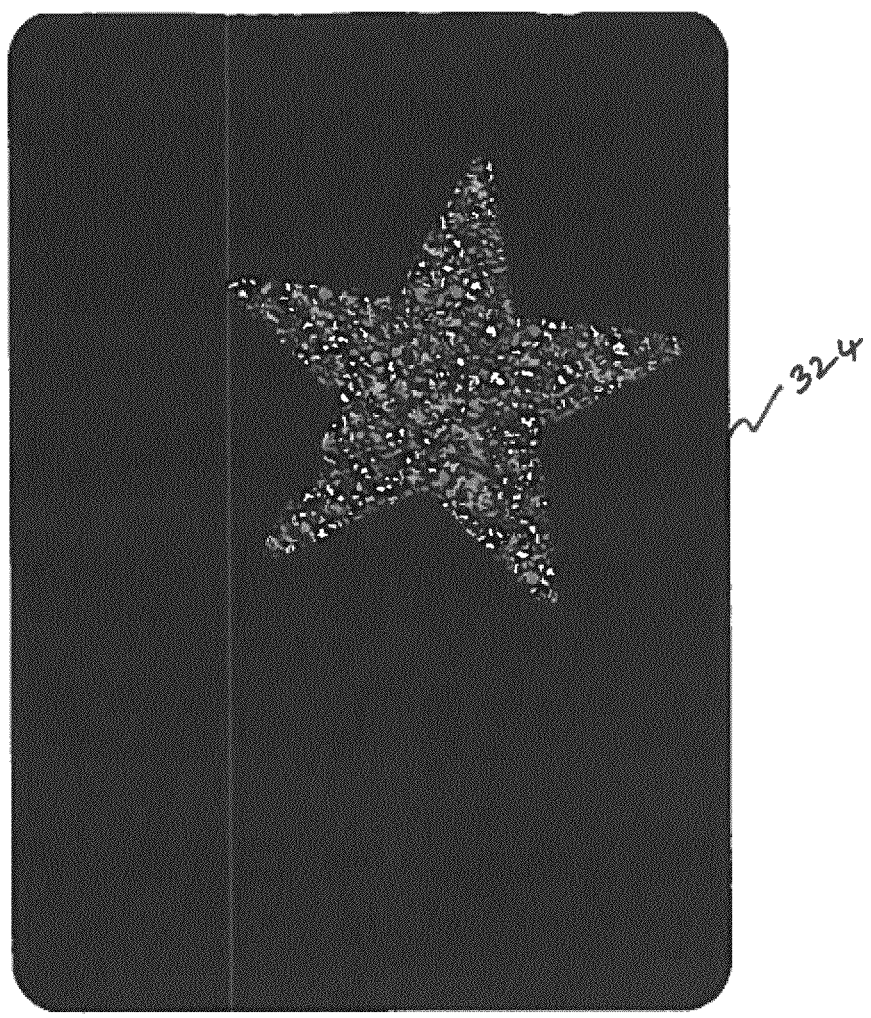
FIG. 11 shows an exemplary glitter highlight image.
Figure 12:
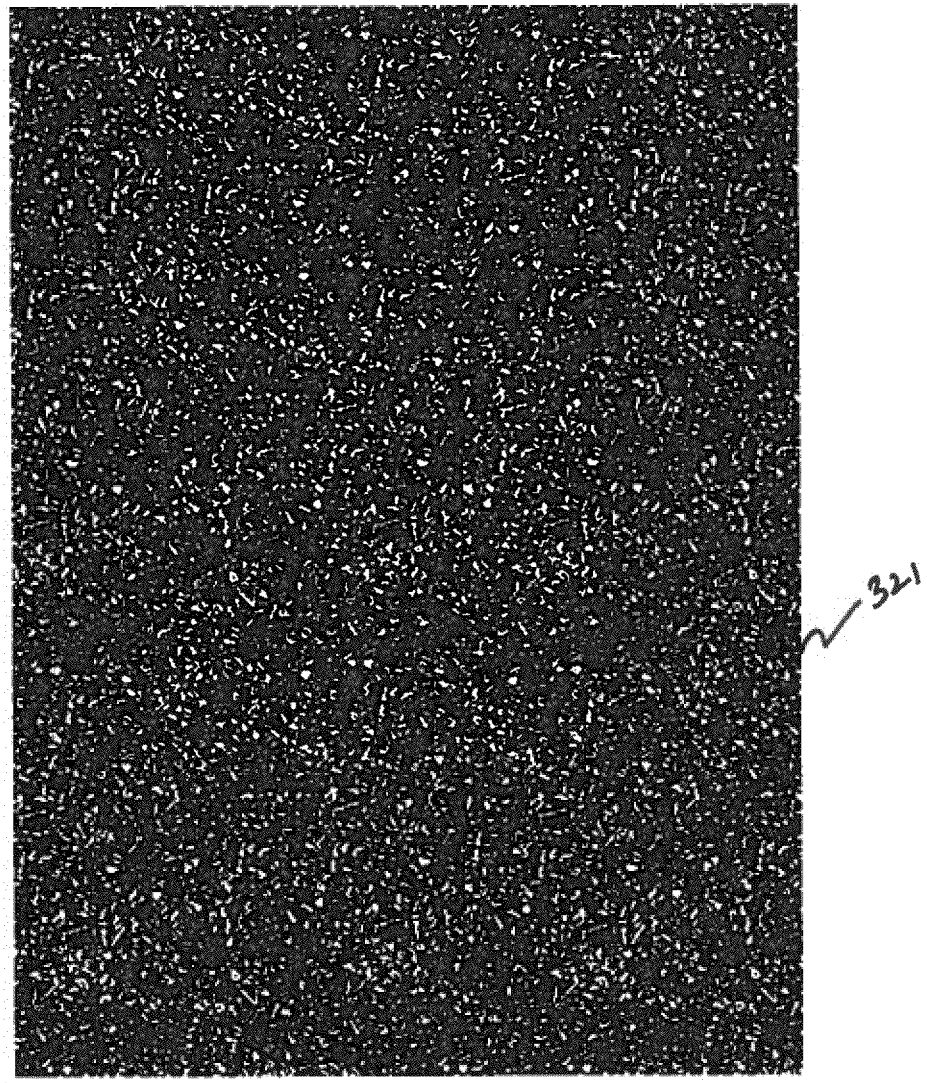
FIG. 12 shows an exemplary glitter shimmer image.

An exemplary embodiment of the present invention (JavaScript implementation) will be described in greater detail below. A user 105 navigates to an electronic greeting card page on a web browser. An exemplary greeting card 110 that the user 105 selected is shown in FIG. 9. After card selection, when the document object model (DOM) is ready, a loading indicator would be displayed to the user 105. Using JavaScript, the following assets 120 would be loaded into image objects: (1) a glitter base 304 (FIG. 10); (2) a glitter highlight 324 (FIG. 11); (3) a glitter shimmer 321 (FIG. 12). All these assets 120 are rendered into a Canvas element via the 2D drawing context's drawImage method in Java Script. The glitter shading algorithm 300 is then invoked. In this algorithm 300, a final highlight image 326 is created as follows. First, a new canvas in Java Script is created, then the glitter highlight image 324 is rendered on the new Canvas. Using a transformation matrix, a random translation is applied on the x and y axis by step 322. In the case of a translation, the x and y values of the pixels of an image are modified causing the image to translate or move slightly on the display. The algorithm randomly generates values for the translation. This causes the image to "shimmer" as the pixels are repeatedly randomly translated causing the lighter portions of the image to constantly move. By randomly generating the x and y values we get a slightly different offset which means the result of the blend will produce a visual that is a little bit different than the last frame. An exemplary resulting image 323 from step 322 is shown in FIG. 13.

Figure 14:
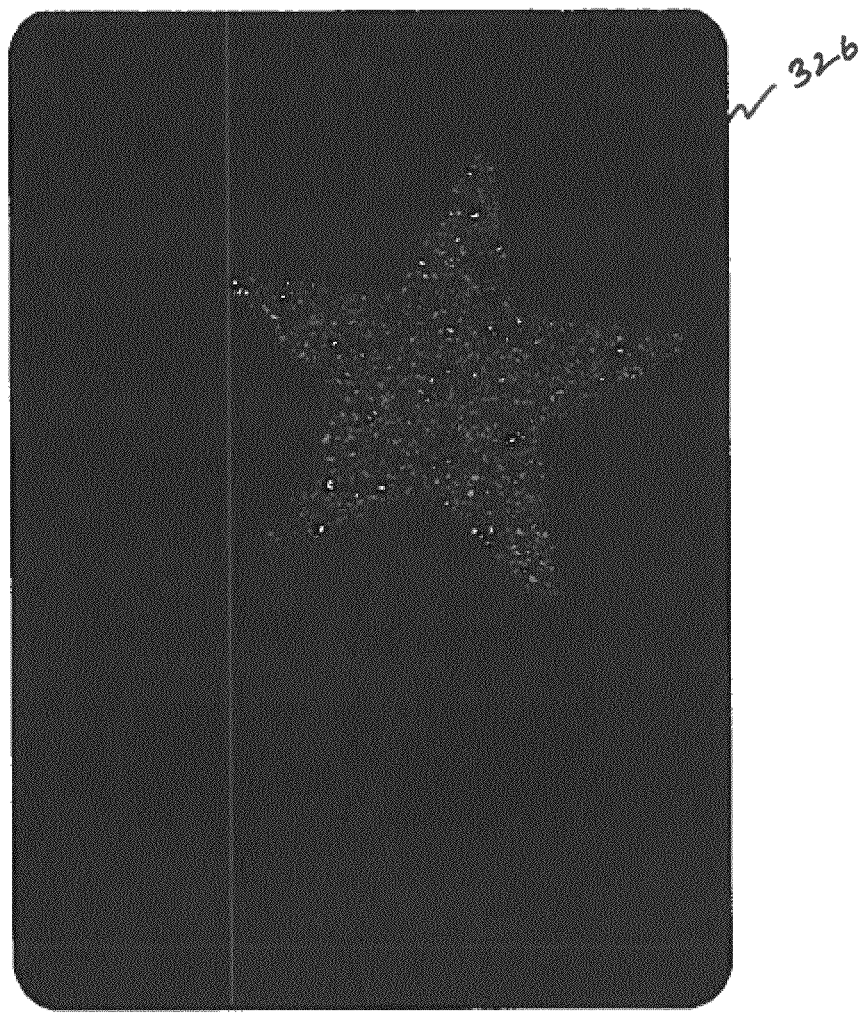
FIG. 14 shows the exemplary glitter shimmer image after being multiply blended on to a Canvas.
Figure 15:
FIG. 15 shows an exemplary final highlight image.
Figure 16:
FIG. 16 shows the resulting final image applied to a 3D transformed Canvas element in a web browser.
Figure 17:
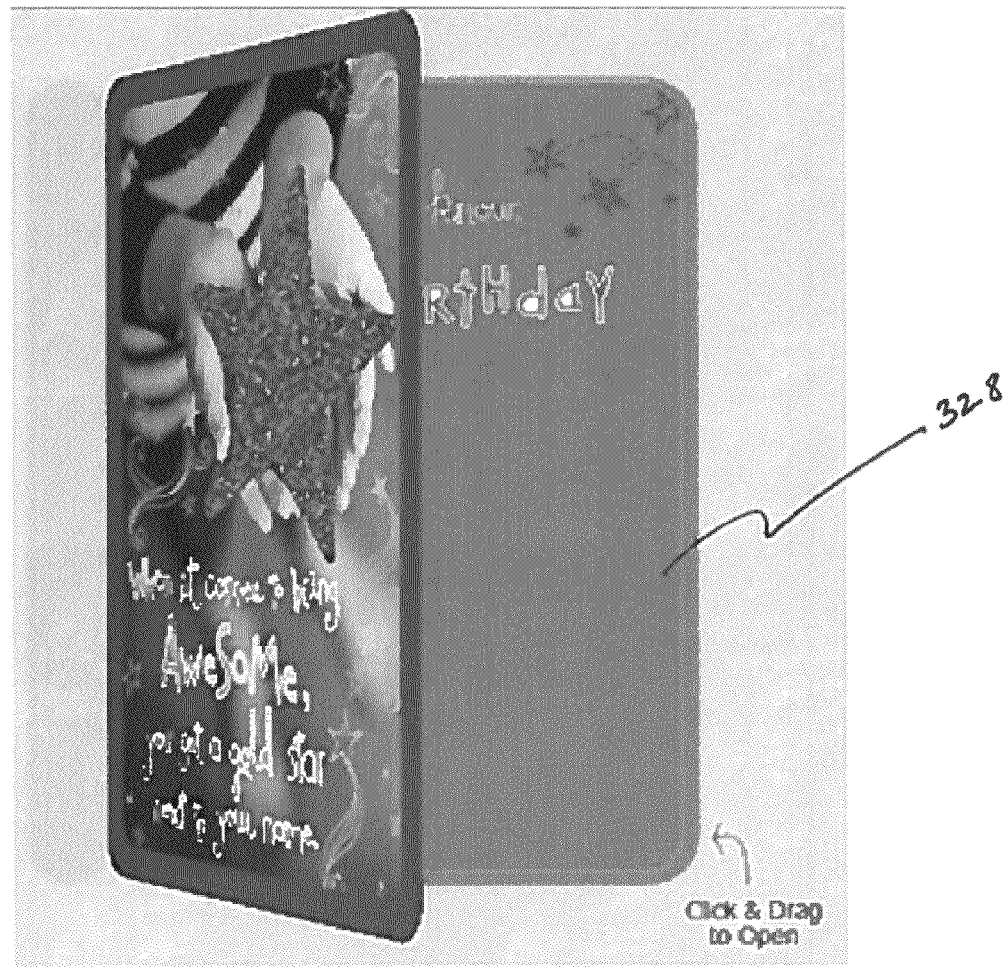
FIG. 17 shows another view of the resulting final image applied to a 3D transformed Canvas element in a web browser.

Then, the modified shimmer image 323 is multiply blended with highlight glitter 324 resulting in the image shown in FIG. 14, the final highlight image 326. Next, the final highlight image 326 is applied to the glitter base image 304 as follows. First, a new Canvas is created, then the glitter base image 304 is rendered on to this new Canvas. The final highlight image 326 is additively blended on to the new Canvas and results in the final glitter shaded image 328 shown in FIG. 15. The final image 328 is then stored in memory. The image 328 is then rendered on to the Canvas element that represents the cover of the electronic greeting card 110 for the user 105 to see. FIG. 16 shows the resulting final image 328 applied to a 3D transformed Canvas element in a web browser. FIG. 17 shows another view of the resulting final image 328 applied to a 3D transformed Canvas element in a web browser. A 3D transformed Canvas allows a user to actually "turn" the pages of a card and the images will appear three-dimensional as the pages are turned. After the digital glitter effect is rendered it can be applied to an object in 3D to add extra realism. Every time the angle between the surface of the 3D geometry where the digital glitter is initially applied to the angle of the screen, the digital glitter effect is recreated adding 3D realism to reflections of light.

The system then enters a user input loop where it waits for a user input and every time the user interacts with the card via a mouse or touch, the system reverts to the step of invoking the glitter shading algorithm 300 described above. To improve performance of the system, once the six final images described above are rendered, the system no longer renders new images and cycles through the pre-rendered and stored images. This also results in the highlights 325 varying with each cycle of the process described herein, thereby producing the appearance of a real physical glitter.

Another exemplary embodiment (ActionScript implementation) of the present invention will be described in greater detail below. A user 105 executes an application of the inventive system 100 by selecting a digital greeting card. The following assets 120 would then be loaded into loader objects: (1) a glitter base 304; (2) a glitter highlight 324; (3) a glitter shimmer 321. All these assets 120 are rendered into a BitmapData object via the BitmapData's draw method in ActionScript. The glitter shading algorithm 300 is then invoked. In this algorithm 300, a final highlight image 326 is created as follows. First, a new BitmapData in ActionScript is created, then the glitter highlight image 324 is rendered on the new BitmapData. Using a transformation matrix, a random translation is applied on the x and y axis by step 322 resulting in a modified shimmer image 323.

Then, the modified shimmer image 323 is multiply blended with highlight glitter 324, resulting in the BitmapData final highlight image 326. Next, the final highlight image 326 is applied the glitter base image 304 as follows. First, a new BitmapData is created, then the glitter base image 304 is rendered on to this new BitmapData. The final highlight image 326 is additively blended on to the new BitmapData and results in the final glitter shaded image 328. The final image 328 is then stored in memory. The image 328 is then rendered on to a BitmapData object that represents the cover of the electronic greeting card 110 for the user 105 to see.

Figure 18:
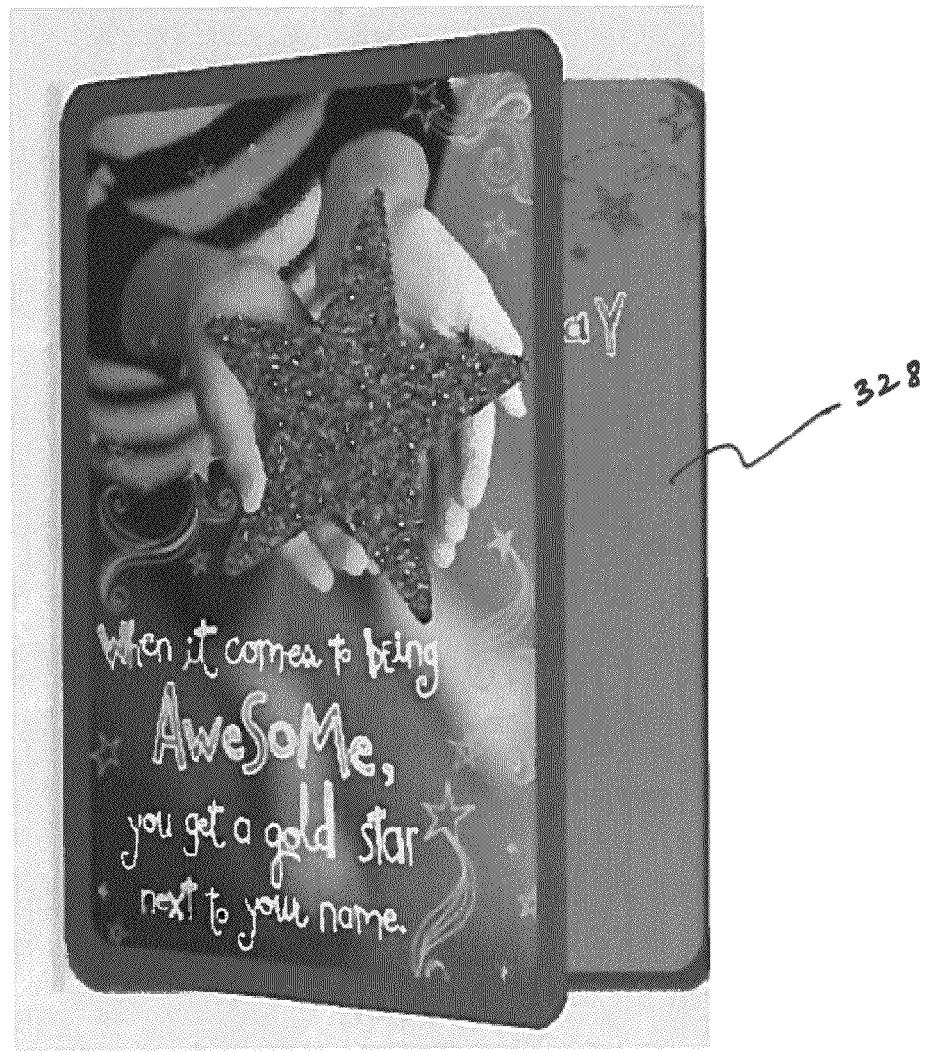
FIG. 18 shows the resulting final image 328 as a result of this ActionScript implementation

The system then enters a user input loop where it waits for a user input and every time the user interacts with the card via a mouse or touch, the system reverts to the step of invoking the glitter shading algorithm 300 described above. To improve performance of the system, once the six final images described above are rendered, the system no longer renders new images and cycles through the pre-rendered and stored images. FIG. 18 shows the resulting final image 328 as a result of this ActionScript implementation.

Figure 19:
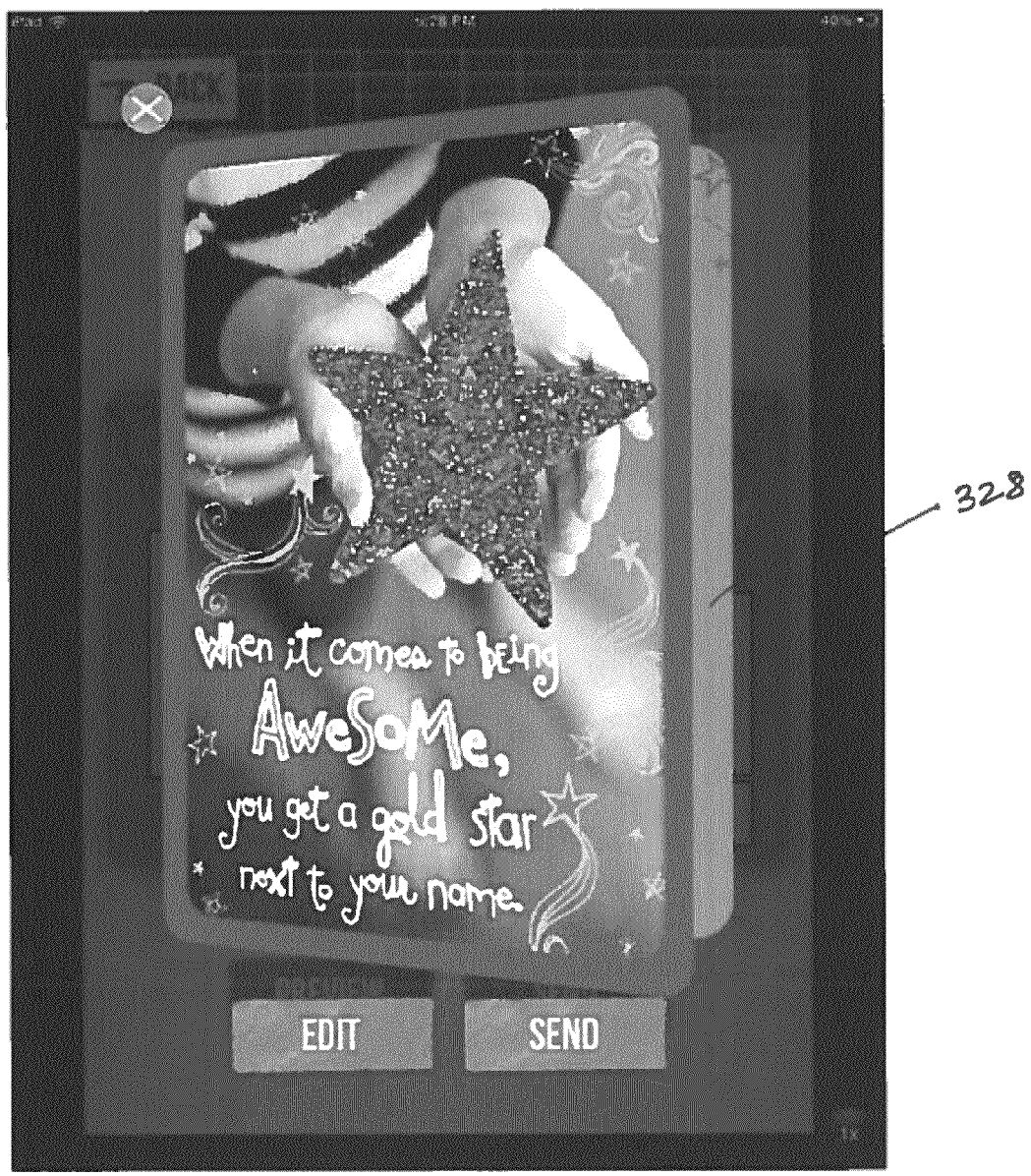
FIG. 19 shows the resulting final image as a result of Objective C implementation on an iPad®.

The algorithms of the present invention may also be implemented in several other languages. For example, in iOS native applications, the algorithms could be implemented in Objective C language. The Objective C implementation uses OpenGL ES API, where blending is achieved very quickly (without caching), and performed in a fragment shader of the GPU using OpenGL ES Shading Language. FIG. 19 shows the resulting final image of Objective C implementation on an iPad®.

Similarly, in Android native applications, the algorithms could be implemented in Java language. The Java implementation uses OpenGL ES and the blending is achieved very quickly (without caching), and performed in a fragment shader of the GPU using OpenGL ES Shading Language.

The above description of specific embodiments has been given by way of example. From the disclosure given, those skilled in the art will not only understand the general inventive concepts and attendant advantages, but will also find apparent various changes and modifications to the structures and methods disclosed. For example, although the embodiments disclosed herein have been primarily directed to a digital glitter effect, the general inventive concepts could be readily extended to hot stamp (foil) and embossing effects. It is sought, therefore, to cover all such changes and modifications as fall within the spirit and scope of the general inventive concepts, as described and claimed herein, and equivalents thereof. The descriptions of the exemplary embodiments do not limit the invention or terms of any future claims in any way, which claims will have all of their full, ordinary meanings.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus and illustrative examples shown and described. Accordingly, departures may be made from such details without departing from the spirit or scope of the applicants' general inventive concept.

We claim:

1. A machine for rendering an electronic greeting card to a portable computing device comprising:
    a server;
    an algorithm accessed and run by the server;
    wherein the algorithm updates visually-perceived light effects of the electronic greeting card in real time;
    wherein the algorithm comprises
        blending a base image with a diffused light texture to produce a diffused base image,
        blending a shimmer texture with a highlighted texture to produce a final highlight texture, wherein a location of the shimmer texture is constantly updated in real time by a pseudo-random translation of pixels, and
        blending the final highlight texture with the diffused base image to produce the visually-perceived light effects of the electronic greeting card;
    wherein the electronic greeting card is dynamically rendered to the portable computing device.

2. The machine of claim 1 wherein the electronic greeting card is two-dimensional.

3. The machine of claim 1 wherein the electronic greeting card is three-dimensional.

4. The machine of claim 1 wherein the algorithm dynamically renders the electronic greeting card based on physical interaction with the greeting card.

5. The machine of claim 1 wherein the algorithm dynamically renders the electronic greeting card during movement of the portable computing device.

6. The machine of claim 1 wherein the electronic greeting card has at least two pages.

7. The machine of claim 6 wherein the algorithm dynamically renders the electronic greeting as a page is moved.

8. The machine of claim 1 wherein the algorithm comprises an additive blend mode.

9. The machine of claim 1 wherein the algorithm comprises a multiply blend mode.

10. A method for rendering an electronic greeting card to a portable computing device comprising:
    blending a base image with a diffused light texture to produce a diffused base image;
    blending a shimmer texture with a highlighted texture to produce a final highlight texture;
    blending the final highlight texture with the diffused base image to produce the image of the electronic greeting card;
    rendering the electronic greeting card on the portable computing device;
    wherein a location of the shimmer texture is constantly updated in real time by a pseudo-random translation of pixels.

11. An electronic greeting card comprising:
    at least two pages;
    visually-perceived light effects that are updated in real-time by an algorithm comprising
        blending a base image with a diffused light texture to produce a diffused base image,
        blending a shimmer texture with a highlighted texture to produce a final highlight texture, wherein a location of the shimmer texture is constantly updated in real time by a pseudo-random translation of pixels, and
        blending the final highlight texture with the diffused base image to produce the visually-perceived light effects of the electronic greeting card; and
    wherein at least one of the at least two pages can be moved and the visually-perceived light effects are dynamically updated as a result of a movement.

12. The electronic greeting card of claim 11 wherein the electronic greeting card is rendered in Java Script.

13. The electronic greeting card of claim 11 wherein the electronic greeting card is rendered in Action Script.

14. The electronic greeting card of claim 11 wherein the electronic greeting card is rendered on an iPad®.

15. The electronic greeting card of claim 11 wherein a base image of the electronic greeting card contains transparency.

16. The electronic greeting card of claim 11 wherein a base image of the electronic greeting card is opaque.

17. The electronic greeting card of claim 11 that is rendered using a multiply blend mode.

18. The electronic greeting card of claim 11 that is rendered using an additive blend mode.

* * * * *